(12) United States Patent
Church et al.

(10) Patent No.: US 9,395,718 B1
(45) Date of Patent: Jul. 19, 2016

(54) OPTIMIZATION OF UNIQUE ANTENNA AND RF SYSTEMS FOR SPECIFIC SUBSTRATES

(75) Inventors: Kenneth H. Church, Orlando, FL (US);
Robert M. Taylor, Perkins, OK (US);
Michael J. Wilhelm, Stillwater, OK (US); Hao Dong, Sanford, FL (US);
Yanzhong Li, Orlando, FL (US)

(73) Assignee: Sciperio, Inc., Orlando, FL (US)

( * ) Notice: Subject to any disclaimer, the term of this patent is extended or adjusted under 35 U.S.C. 154(b) by 824 days.

(21) Appl. No.: 11/422,176

(22) Filed: Jun. 5, 2006

Related U.S. Application Data

(60) Provisional application No. 60/595,073, filed on Jun. 3, 2005.

(51) Int. Cl.
*G06F 17/50* (2006.01)
*G05B 19/4097* (2006.01)

(52) U.S. Cl.
CPC .................................. *G05B 19/4097* (2013.01)

(58) Field of Classification Search
USPC .............. 700/97, 98, 182, 121; 703/1, 13, 14; 716/1, 2, 5, 9–11, 100
See application file for complete search history.

(56) References Cited

U.S. PATENT DOCUMENTS

| | | | |
|---|---|---|---|
| 4,736,454 A | | 4/1988 | Hirsch |
| 6,052,517 A | * | 4/2000 | Matsunaga et al. ............ 716/119 |
| 6,859,178 B1 | * | 2/2005 | Ryken et al. ............ 343/700 MS |
| 7,050,876 B1 | * | 5/2006 | Fu et al. ......................... 700/118 |
| 7,363,087 B2 | * | 4/2008 | Nghiem et al. ................. 607/60 |
| 7,365,701 B2 | * | 4/2008 | Werner et al. ................. 343/909 |
| 7,383,092 B2 | * | 6/2008 | Tamura et al. .................. 700/98 |
| 7,443,362 B2 | * | 10/2008 | Yungers ........................ 343/895 |
| 2002/0122006 A1 | | 9/2002 | Crawford |
| 2002/0190904 A1 | | 12/2002 | Cohen |
| 2003/0001780 A1 | | 1/2003 | Hill et al. |
| 2003/0038752 A1 | | 2/2003 | Park |
| 2003/0201183 A1 | | 10/2003 | Moore |
| 2004/0001021 A1 | * | 1/2004 | Choo et al. ............ 343/700 MS |
| 2004/0043795 A1 | | 3/2004 | Zancewicz |
| 2004/0210545 A1 | | 10/2004 | Branke et al. |
| 2005/0015175 A1 | | 1/2005 | Huang |
| 2005/0046510 A1 | | 3/2005 | Kerner et al. |

(Continued)

OTHER PUBLICATIONS

Jin, N.; Rahmat-Samii, Y.; "Parallel particle swarm optimization and finite-difference time-domain (PSO/FDTD) algorithm for multiband and wide-band patch antenna designs," IEEE Transactions on Antennas and Propagation vol. 53, Issue 11, Nov. 2005, pp. 3459-3468, IEEE Antennas and Propagation Society (Poscataway, N.J. US).

(Continued)

*Primary Examiner* — Mohammad Ali
*Assistant Examiner* — Sheela S Rao
(74) *Attorney, Agent, or Firm* — Goodhue, Coleman & Owens, P.C.

(57) ABSTRACT

A method incorporating an antenna and RF circuitry into the object acting as a substrate includes modeling the object as a three-dimensional object, and designing the antenna and RF circuitry for direct placement on the surface of the object. The step of designing is at least partially based on the size, three-dimensional shape, and material properties of the surface of the object acting as the substrate. The step of designing is preferably performed through use of an evolutionary optimizer implemented using parallel computing devices.

28 Claims, 8 Drawing Sheets

(56) References Cited

U.S. PATENT DOCUMENTS

| | | |
|---|---|---|
| 2005/0060391 A1 | 3/2005 | Kaminsky et al. |
| 2005/0087284 A1* | 4/2005 | Tebbe et al. .............. 156/89.11 |
| 2005/0093111 A1 | 5/2005 | Berman et al. |
| 2005/0123857 A1 | 6/2005 | Luch |
| 2006/0001584 A1 | 1/2006 | Durso et al. |
| 2006/0015829 A1 | 1/2006 | De Smedt et al. |

OTHER PUBLICATIONS

Villegas, F.J.; Cwik, T.; Rahmat-Samii, Y.; Manteghi, M.; "A parallel electromagnetic genetic-algorithm optimization (EGO) application for patch antenna design," IEEE Transactions on Antennas and Propagation, vol. 52, Issue 9, Sep. 2004, pp. 2424-2435, IEEE Antennas and Propagation Society (Piscataway, N.J. US).

Lucci, L.; Nesti, R.; Pelosi, G.; Selleri, S.; "Optimization of profiled corrugated circular horns with parallel genetic algorithms," IEEE Transactions on Antennas and Propagation Society International Symposium, vol. 2, Jun. 16-21, 2002, pp. 338-341, IEEE Antennas and Propagation Society (Piscataway, N.J. US).

Chakravarty, S.; Mittra, R.; "Design of a frequency selective surface (FSS) with very low cross-polarization discrimination via the parallel micro-genetic algorithm (PMGA),"IEEE Transactions on Antennas and Propagation, vol. 51, Issue 7, Jul. 2003, pp. 1664-1668, IEEE Antennas and Propagation Society (Piscataway, N.J. US).

Zhifang, Li; Erdemli, Y.E.; Volakis, J.L.; Papalambros, P.Y.; "Design optimization of conformal antennas by integrating stochastic algorithms with the hybrid finite-element method," IEEE Transactions on Antennas and Propagation, vol. 50, Issue 5, May 2002, pp. 676-684, IEEE Antennas and Propagation Society.

Haupt, Randy L.; "An Introduction to Genetic Algorithms for Electromagnetics," IEEE Antenna and Propagation Magazine, vol. 37, No. 2, Apr. 1995, IEEE Antennas and Propagation Society (Piscataway, N.J. US).

Weile, Daniel S.; Michielssen, Eric; "Genetic Algorithm Optimization Applied to Electromagnetics: A Review", IEEE Transactions on Antenna and Propagation, vol. 45, No. 3, Mar. 1997, IEEE Antennas and Propagation Society (Piscataway, N.J. US).

Johnson, J. Michael; Rahmat-Samii, Yahya; "Genetic Algorithms in Engineering Electromagnetics," IEEE Antennas and Propagation Magazine, vol. 39, No. 4, Aug. 1997, IEEE Antennas and Propagation Society (Piscataway, N.J. US).

Altshuler, Edward E.; Linden, Derek S.; "Wire-Antenna Designs Using Genetic Algorithms," IEEE Antenna and Propagation Magazine, vol. 39, No. 2, Apr. 1997, IEEE Antennas and Propagation Society (Piscataway, N.J. US).

Hoorfar, Ahmad; "Evolutionary Computational Techniques in Electromagnetics," MMET*02 Proceedings, 2002 , IX-Th International Conference on Mathematical Methods in Electromagnetic Theory (Kiev UA).

Knott, Peter; "Conformal Array Pattern Synthesis," FGAN-FHR, Mar. 31, 2005, Forschungsgesellschaft für Angewandte Naturwissenschaften e.V. (Wachtberg DE).

* cited by examiner

OPTIMIZATION OF UNIQUE ANTENNA AND RF SYSTEMS FOR SPECIFIC SUBSTRATES

CROSS-REFERENCE TO RELATED APPLICATIONS

This application claims the benefit of provisional patent application Ser. No. 60/595,073, filed Jun. 3, 2005, entitled Parallel Optimization for Antenna Systems, the contents of which are hereby incorporated by reference in their entirety.

FIELD OF THE INVENTION

The present invention relates generally to the design of electronic circuits, including, without limitation, antennas and RF circuits for integration into products, devices or other objects.

BACKGROUND OF THE INVENTION

Product designs are often constrained by the need to include antennas and radio frequency (RF) circuits. Whether it is an antenna extending from a car or from a cell phone, antennas are incorporated into various product designs. Although consumers perhaps have been conditioned not to notice, an antenna extending from a product can be unsightly. Product designs can be particularly constrained by antenna design in products or devices having small size or irregular shape. In addition product design can by constrained by RF circuitry design, particularly for high frequencies.

A related problem is the complexity of design associated with antennas, RF circuits, high frequency circuits, and other types of complex AC circuit design. Whereas DC circuit design is typically straightforward, the design of antennas, RF circuits, and other types of high frequency or complex AC circuit designs often present complex electromagnetic problems which must be solved to avoid adversely impacting the performance of the resulting design.

What is needed is the ability to design electronic circuits, including antennas and RF circuits in a manner which does not constrain the shape that a product, device, or other object must have.

SUMMARY OF THE INVENTION

According to one aspect of the present invention, a method for incorporating an antenna and RF circuitry into an object with a surface of the object acting as a substrate for the antenna and RF circuitry is provided. The object has a size, a three-dimensional shape, and material properties. The method includes modeling the object as a three-dimensional object and designing the antenna and RF circuitry for direct placement on the surface of the object. The step of designing is at least partially based on the size, three-dimensional shape, and material properties of the surface of the object which acts as the substrate. The step of modeling can be performed using a three-dimensional CAD model of the object or through scanning the object. The step of designing can include applying an evolutionary algorithm such as a genetic algorithm, or use of a neural network. The step of designing can also include using an electromagnetic solver, circuit simulator, and parallel processing.

According to another aspect of the present invention, a method for incorporating an antenna into an object with a surface of the object acting as a substrate for the antenna is provided. The object has a size, a three-dimensional shape, and material properties. The method includes modeling the object as a three-dimensional object and designing the antenna to provide an antenna design adapted to conform to the surface of the object. The antenna design is at least partially based on the size, three-dimensional shape, and material properties of the object acting as the substrate. The method further provides for improving the design of the antenna by applying an evolutionary optimization process and for placing the antenna on the surface of the object without a separate substrate. The surface of the object may be modified by applying an underlayer to the surface of the object. The step of placing may be performed by a process such as direct writing.

According to yet another aspect of the present invention, an apparatus is provided. The apparatus includes an object having a three-dimensional shape, a conformal antenna, and a radio-frequency circuit operatively connected to the conformal antenna. The conformal antenna and the radio-frequency circuit are directly written on the object and in direct contact with the object.

DETAILED DESCRIPTION OF THE PREFERRED EMBODIMENTS

The present invention recognizes the need for the design of electronic circuits, particularly antennas and RF circuits, which are integrated into various products, devices, or other objects. The present invention provides for integrating antennas and circuits into an object in a manner which, instead of constraining the design of the object, including its shape and/or size, takes into account the three dimensional shape and/or size of the object in designing the antennas and circuits in a manner that does not sacrifice desired performance. Thus, the present invention provides for a process in which antennas and RF circuits are specifically designed based on the shape and size of the object such that they can be wrapped around the object or otherwise conformed to the object.

It is an object, feature, or advantage of the present invention in at least some of its embodiments to provide a methodology for designing antennas and RF systems that conform to various sizes and three-dimensional shapes. It is a still further object, feature, or advantage of the present invention in at least some of its embodiments to provide for designing antennas and RF systems for a variety of sizes and shapes without sacrificing performance. Yet another object, feature, or advantage of the present invention in at least some of its embodiments is to provide for the design and fabrication of RF systems which are smaller, conformal, and electrically superior to standard RF systems. A further object, feature, or advantage of the present invention in at least some of its embodiments is to remove the limitations associated with conventional manufacturing techniques and design methodologies. One or more of these and/or other objects, features, or advantages of the present invention will become apparent from the specification and claims that follow.

It is to be understood that in circuit design there are a number of complexities that affect performance. This is especially in the case of antenna design and RF circuit design as well as other AC, analog, or mixed signal circuits, particularly which incorporate high frequency circuits. Performance may be affected by the location of different parts relative to one another as well as the location, size, shape, and composition of nearby materials. For example, where an RF circuit is placed on a planar substrate, merely bending the substrate may result in significantly different performance. The present invention recognizes the need for antenna and RF circuitry design to conform to objects of various sizes, shapes, and materials, and the present invention addresses the complexities associated with such antenna and RF circuitry design, and identifies appropriate technologies for fabrication of such designs.

Figure 1:
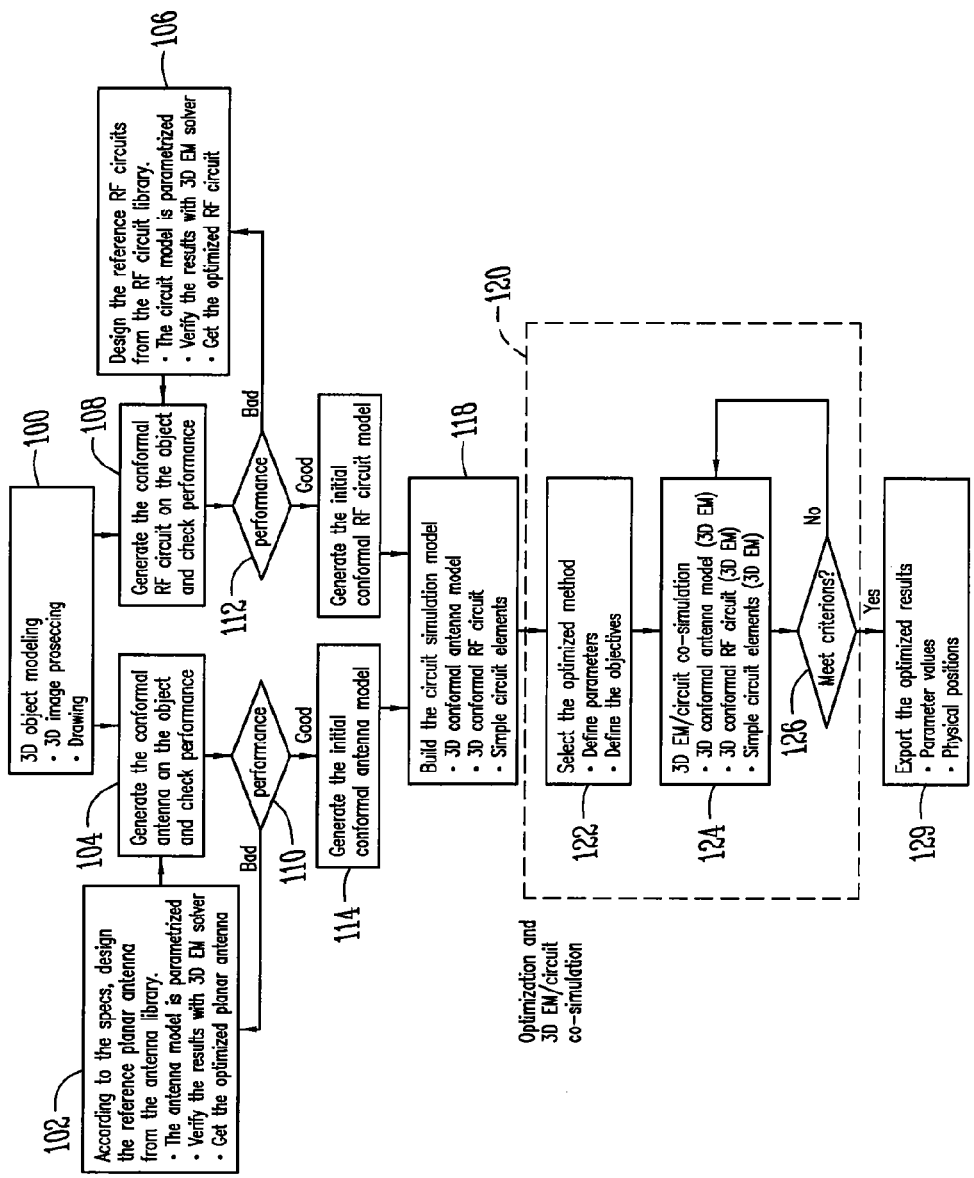
FIG. 1 is a block diagram illustrating the methodology according to one embodiment of the invention.

FIG. 1 illustrates a block diagram of the methodology according to one embodiment of the present invention. In step 100 three-dimensional (3D) object modeling is performed. The 3D object modeling can be performed in various ways. According to one methodology, an object is modeled through capturing images of the object and applying 3D image processing techniques. Alternatively, CAD drawings can be used as the basis of the object model. The resulting object model preferably includes information sufficient to determine the size and shape of the object and material properties of the object. The material properties include, for example, mechanical properties of the object or electrical properties of the object.

In step 102, according to a design specification, a reference planar antenna is designed. The design of the reference planar antenna may involve use of an antenna library to simplify the design process. The antenna model is parameterized and the results may be verified with a 3D electromagnetic (EM) solver resulting in an optimized reference planar antenna. Various parameters for the antenna model may include limitations imposed by the object, such as substrate shape, substrate mechanical size, substrate mechanical properties, and substrate electrical properties. In addition, various parameters include desired bandwidth of performance, desired VSWR performance, desired gain of performance, desired impedance, desired radiation pattern, desired physical size of antenna or RF circuit, desired EM shielding, and other parameters.

In step 104, a conformal antenna on the object is generated and performance is checked through simulation.

Similarly, in step 106, the reference RF circuit is designed, preferably using circuits from an RF circuit library to simplify the process. The reference circuit model is parameterized. The results are verified with a 3D EM solver resulting in an optimized reference RF circuit. In step 108, the conformal RF circuit is generated on the object and performance is checked through simulation.

In step 110 a determination is made as to whether or not the performance of the conformal antenna is sufficiently good. If not, then in step 102 the design is redesigned or adjusted. If the performance is acceptable, then in step 114 an initial conformal antenna model is generated. Similarly, in step 112 a determination is made as to whether or not the performance of the conformal RF circuit is sufficiently good. If not, then in step 106 the reference RF circuit designed is redesigned or adjusted. If the performance of the RF circuit is acceptable, then in step 116 the initial conformal RF circuit model is generated.

In step 118 a circuit simulation model is built which includes the 3D conformal antenna model, the 3D conformal RF circuit and other circuit elements as desired. Various commercially available circuit simulators can be used. One common example is SPICE of which various varieties are available from various sources. One such example is PSPICE available from Cadence Systems.

An optimization and 3D EM/circuit co-simulation process 120 occurs. In step 122, the optimization method is selected. This can include defining any necessary parameters and defining the objectives. In step 124, 3D EM/circuit co-simulation is performed. This includes simulating any conformal antenna model by accurate 3D EM simulator, conformal RF circuit by accurate 3D EM simulator, any other circuit elements by the circuit simulator, and combining all the models together in circuit simulator and evaluating the results. In step 126 a determination is made as to whether the results from the optimization meet the criteria for the design. If not, then in step 124 the co-simulation is performed again to find a different solution. If the criteria are met in step 126, then in step 129 the optimized results are exported. These include parameter values, physical positions for the antenna, RF circuits, and simple circuit elements.

Figure 2:
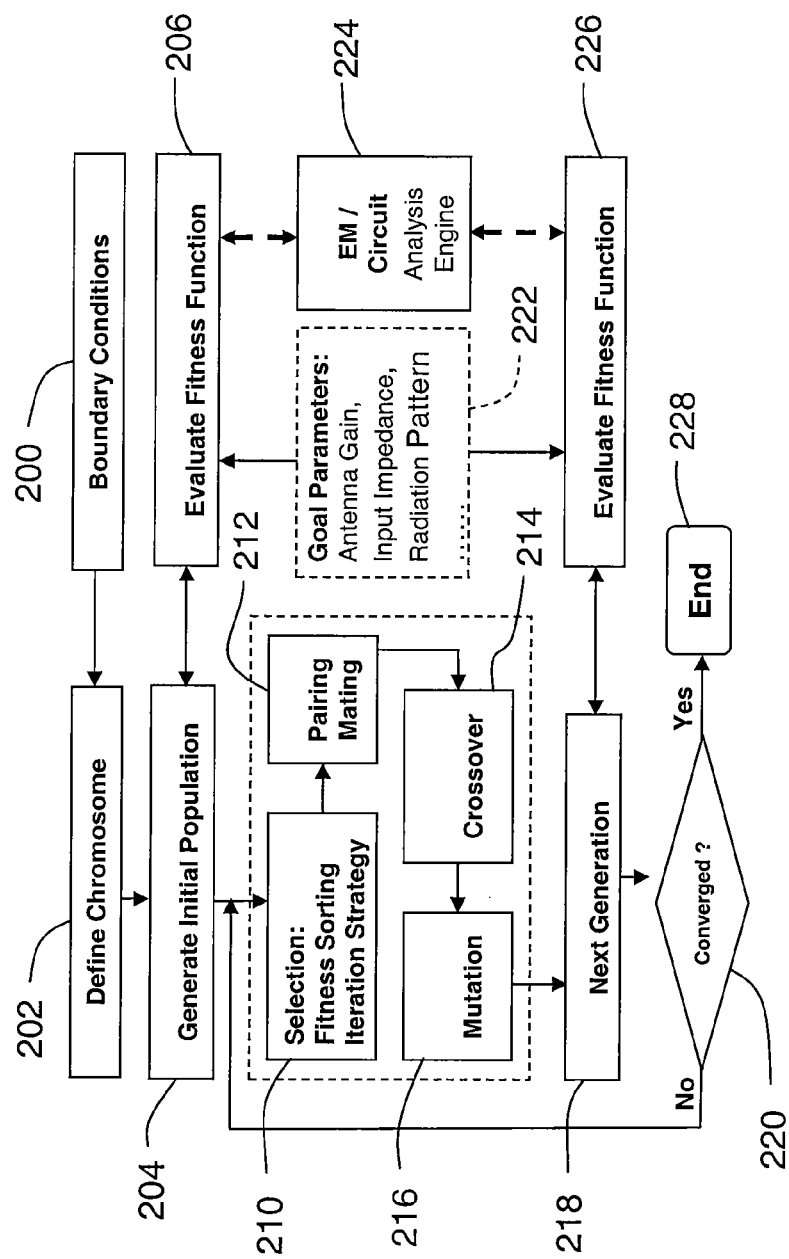
FIG. 2 is a flow chart illustrating the use of a genetic algorithm according to one embodiment of the present invention.

It is to be understood that the co-simulation may be a complex process requiring numerous design iterations to result in an appropriate design. Various algorithms may be used, including neural networks, and evolutionary algorithms such as genetic algorithms. FIG. 2 illustrates one embodiment of a genetic algorithm adapted for use in the present invention. Any number of commercial products can be used to implement a genetic algorithm, evolutionary algorithm or alternative methodology. One example of such a commercial product is the AIMMS product available from Paragon Decision Technology.

A genetic algorithm is one example of an evolutionary algorithm which uses a number of external parameters to obtain a very specific solution. Genetic algorithms have been used in antenna design, with the resulting antenna sometimes being referred to as an "evolved" antenna. As shown in FIG. 2, the genetic algorithm operates on a chromosome, a symbolic representation of a design corresponding to a specific antenna and RF circuits.

A chromosome is a concatenation of genes which stand for the individual design parameters. Boundary conditions associated with the design parameters are specified in step 200. Then, in step 202 a chromosome is defined based on individual define parameters. Next, in step 204, the initial population is set up by randomly generating a set number of chromosomes, all gene parameters following their associated boundary conditions defined in step 200.

The chromosomes are ranked according to their fitness function values. The top ranked one will be the best design. The fitness function is evaluated for individual chromosomes through applying the EM and/or circuit simulation or analysis engine in step 224 and comparing with the goal parameters associated with the specification of the design. The goal parameters are defined in step 222.

If there is not a satisfied design in the initial population as observing their fitness function values, a new child-generation population will be generated to continue the "natural selection" process. In step 210, selection is performed in a fitness sorting iteration. In the child generation, a small part of the chromosomes are directly copied from those at the top of the fitness ranking list in the parent generation. The rest of the population will be generated through pairing (step 212), crossover (step 214), and mutation (step 216) processing. Following some specific rules, two chromosomes are picked up from the parent generation as a parent chromosome pair. Two child chromosomes are then generated by mixing the genes of the parent pair. This procedure is called "crossover". The recombination of the genes generates the new chromosomes. However, crossover does not create new genes. It just copies the genes from the parent to child chromosomes. Crossover is followed by mutation. Mutation usually occurs in a very small percentage, but it produces the new genes by randomly perturbing genes. Mutation is necessary to keep the optimization selection operating globally.

After mutation, the child-generation population or next generation has been formed in step 218. The EM/Circuit simulation engine then is called in step 224 to evaluate the individual fitness functions in step 226. After sorting the fitness function values, the top ranked one will be compared with the threshold. The top one will be the best design if the threshold is reached, otherwise, the similar procedures will repeat again by generating the grandchild generation. This process is actually iterated until no improvement is observed, a set goal is met, or a set of number of generations have passed.

Thus, when the genetic algorithm of FIG. 2 is applied, eventually a specific solution is arrived upon which meets the goal parameters provided in step 222 and stays within the boundary conditions defined in step 200. The specific solution is a design which includes an antenna and RF circuits.

Figure 3:
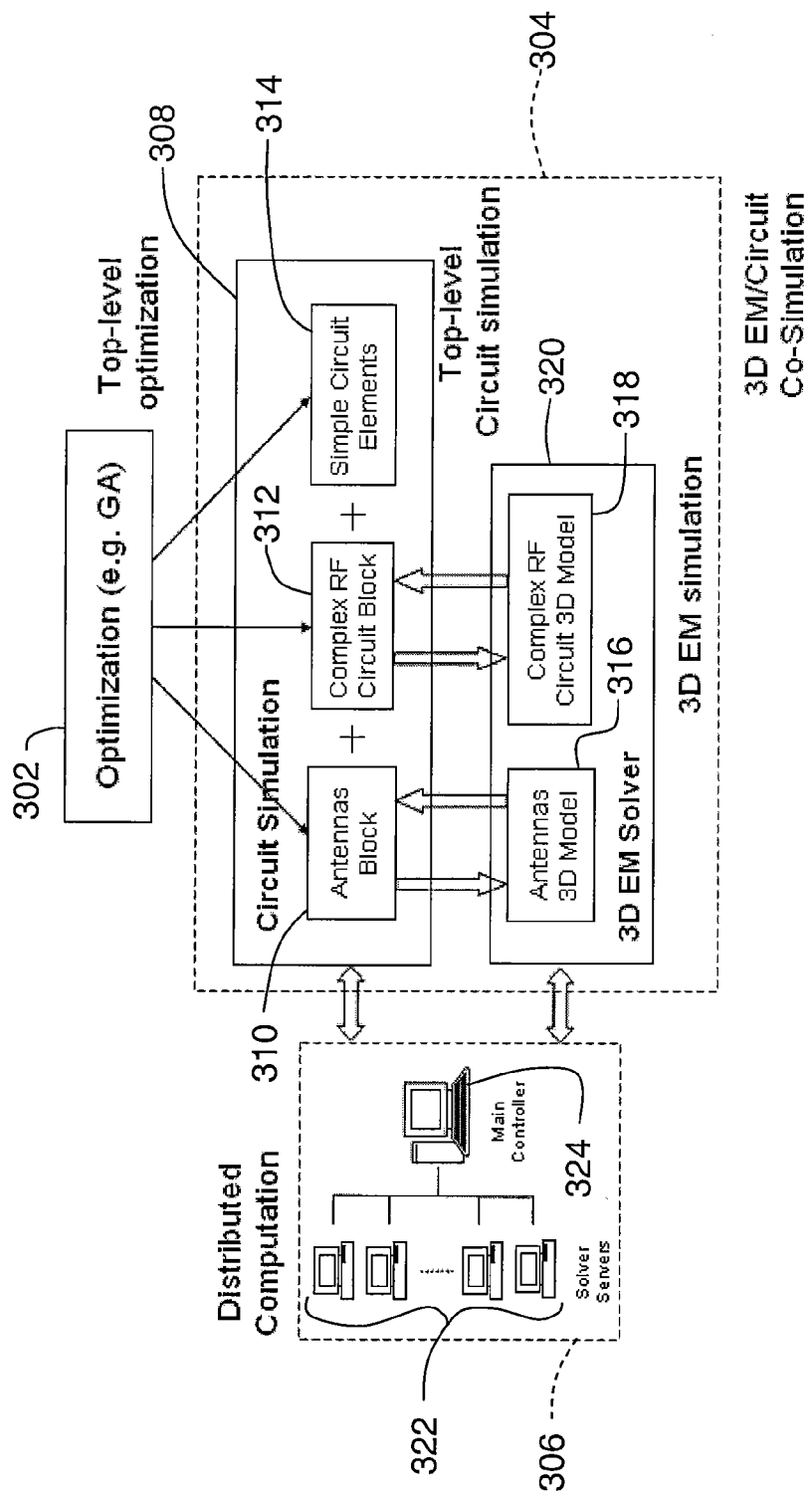
FIG. 3 is a flow chart illustrating optimization of a 3D conformal antenna, 3D conformal RF circuit, and circuit elements with parallel processing according to one embodiment of the present invention.

FIG. 3 provides a block diagram of optimization, 3D EM/circuit co-simulation and parallel processing illustrating one embodiment of a system of the present invention. The system 300 includes an optimization component 302 in operative communication with a circuit simulation component 304. The circuit simulation component 304 is in operative communication with a distributed computation component 306. In this manner, the system 300 provides for optimizing a design, simulating it, and using distributed computing to reduce computation time.

As shown in FIG. 3, the optimization component can use evolutionary algorithms or techniques such as, genetic algorithms. Alternatively, the optimization component could use a neural network or other suitable optimization methodologies. The optimization component 302 is in operative communication with circuit simulation component 308 which provides simulation of an antenna block 310, a complex RF circuit block 312, and simple circuit elements 314. The antenna block 310 and the complex RF circuit block 312 are in operative communication with a 3D EM solver 320. The 3D EM solver 320 includes an antenna 3D model 316 and a complex RF circuit 3D model 318. Both the circuit simulation component 308 and the 3D EM solver component 320 are in operative communication with the distributed computation component 306. The distributed computation component 306 includes a plurality of solver servers 322 operatively connected to a main controller 324. Using a parallel cluster of solver servers 322 reduces the time required to achieve a solution. The solvers may be called thousands of times before a proper solution is obtained. Due to the potential complexity of the problem presented, a typical solver could take seconds, minutes, or even hours to achieve a solution. Thus, in some cases, a solution could not be obtained reasonably without using a parallel computing or distributed computation approach.

Evolutionary algorithms (EA) are very computationally intensive, often requiring massively parallel implementations in order to produce results within an acceptable timeframe. The parallel computation approach can almost speed up the simulation by N times for N solver servers on the cluster. The main controller 324 acts as a broker of information between the solvers 322 and the front end. In this case the circuit simulation component 308 and the 3D EM solver component 320 submit jobs to the main controller 324 which then distributes those jobs to the solver computers 322 which are available within the network.

Figure 4:
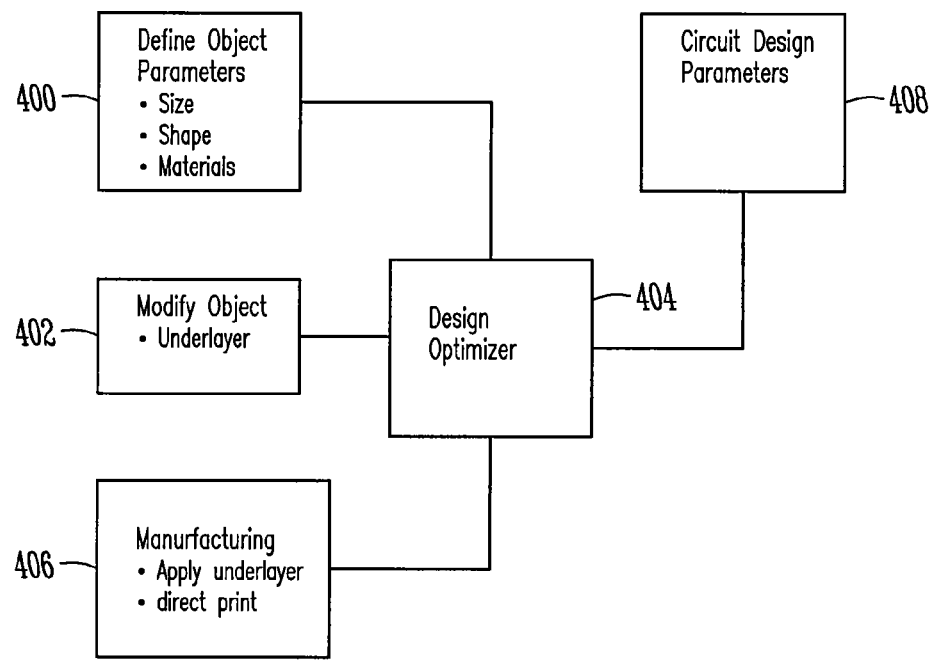
FIG. 4 provides an overview according to one embodiment of the present invention.

FIG. 4 provides an overview according to one embodiment of the present invention. As shown in FIG. 4, in step 400 object parameters are defined. This includes parameters such as size, shape, and material properties. In addition, in step 403, circuit design parameters are defined. The design optimizer 404 takes into account these various properties and applies appropriate modeling, simulation, and/or co-simulation techniques to arrive upon a design. This may include implementations such as those shown in FIG. 2 and FIG. 3. The present invention further contemplates that in some cases it may be necessary or desirable to modify the object. For example, if the object is formed from a highly conductive material, such as a metal, an insulator may be required. In step 402, the object may be modified by adding an underlayer to the object, the underlayer preferably being located under where the circuit is ultimately fabricated. The present invention contemplates that the need for the underlayer may be pre-determined by a user or the design optimizer may recommend or specify an underlayer and its size, shape, location, composition, or other properties as a part of the design process.

The underlay may, for example, be used to change the dielectric constant or act as an insulator. The underlay may be, for example, an FR-4 ceramic. Where an underlay is used, the underlay is placed on at least a portion of the object before direct writing or other similar manufacturing steps. Thus, the present invention recognizes that although an object can be directly written on, its properties may not always be appropriate for a particular design and when such is the case, a portion of the surface of the object can be modified through an underlay which is then written upon.

Once a design has been made, in step 406 the antenna and/or RF circuit are manufactured or fabricated, preferably using a direct write or direct printing technology. The present invention contemplates the use of any number of direct-write technologies. This includes the direct printing of mesoscale materials, such as metals and ceramics for conductors, dielectrics, ferroelectrics, and ferromagnetics. Technologies that can be used include, without limitation, Maskless Mesoscale Materials Deposition (available from M3D), Ink Jet (available from MicroFab), n-Scrypt (available from Sciperio), and micron scale laser sintering and ablation.

Using direct write or direct print technologies antennas and RF circuit may be printed on a variety of materials, and on a variety of surfaces suitable for use in many different types of environments or applications. Surfaces can be large and flat, or small and bumpy. Direct print technology has been used, for example, to write a 100 micron line of silver paste on KAPTON (polyimide), write antennas and RF circuitry on a KEVLAR helmet, and in various other applications.

Where an underlayer is used, the present invention provides for applying the underlayer as a part of the manufacturing process before the step of direct writing. It should further be appreciated that the present invention contemplates that the design may provide for multiple layers. In addition, the present invention contemplates the use of Electronic Band Gap (EBG) designs for specific surfaces as well as array designs, multi-chip module designs, and stacking RF circuits or antennas.

Figure 5:
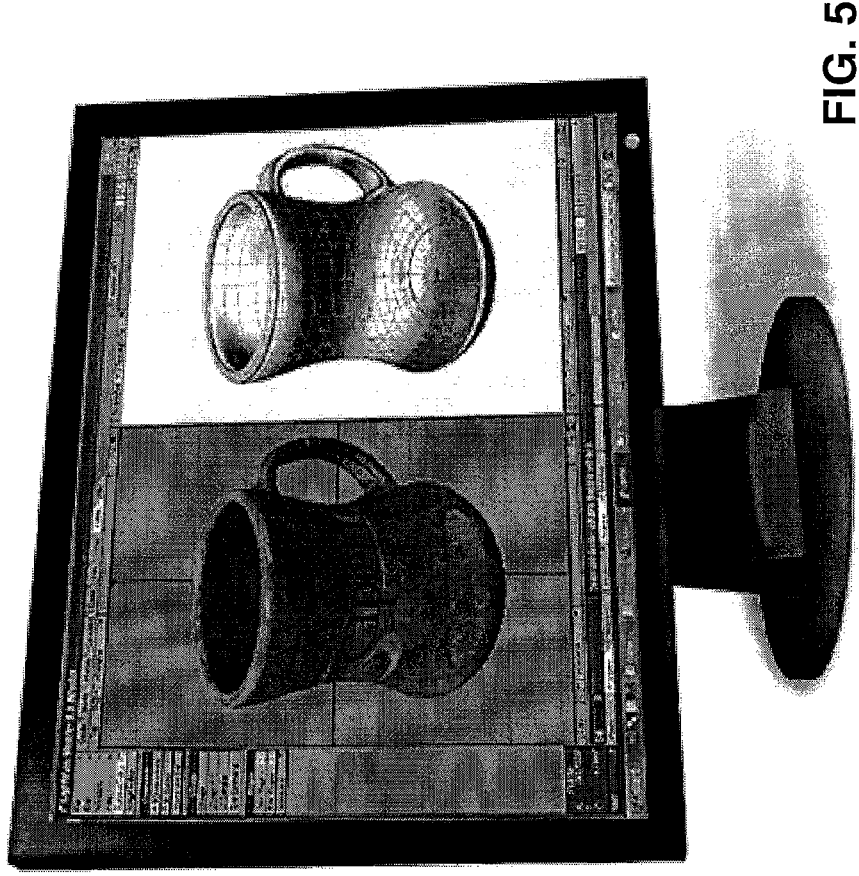
FIG. 5 is a pictorial representation of a computer monitor with a CAD drawing on it. This CAD drawing would have accurate dimensions of X, Y and Z.

FIG. 5 provides a pictorial representation demonstrating the extracting and using the physical shape of the substrate as an input parameter. The physical shape can be obtained through drawings, such as Computer Aided Design (CAD) drawings. Such drawings would have specific dimensions and detailed curves representing accurately what the true substrate would be shaped like. Tolerances of these values will depend on the specific device being designed, but in some cases, it may be necessary to achieve resolutions in the micron regime. Alternatively, objects can be scanned or imaged using various laser or touch probe techniques. Of course, the accuracy of the information must be precise enough to ensure a properly working design.

Figure 6:
FIG. 6 is a pictorial representation of an object with a three-dimensional shape, such as a cup with the proper layout and conformal wrap of an antenna and an RF circuit.

FIG. 6 is a pictorial representation of locating an antenna or RF circuitry on the substrate. Here, the illustrated substrate is a ceramic coffee mug. If there are a significant number of bends and curves, then the location of the antenna or RF circuitry must be precisely modeled and precisely placed to ensure a properly working system.

Figure 7:
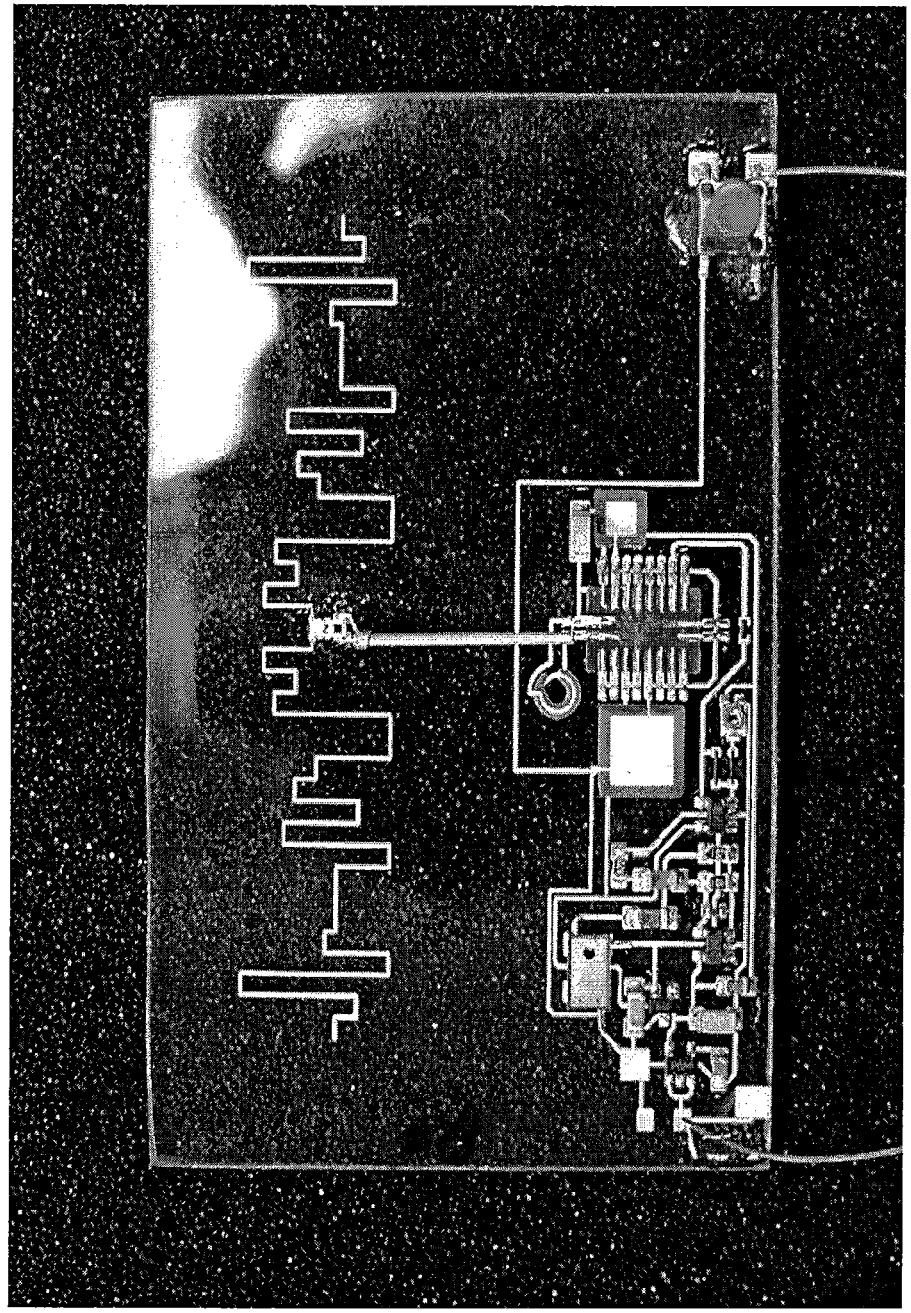
FIG. 7 is a photograph showing a substantially flat glass substrate with a 900 MHz RF circuit and antenna.
Figure 8:
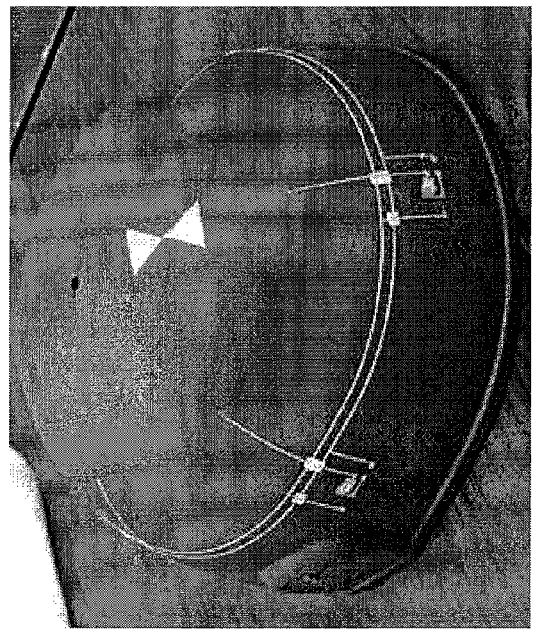
FIG. 8 is a photograph illustrating a Kevlar helmet as a substrate with circuitry directly written onto the helmet.

In one embodiment of the present invention, the substrate can be a glass substrate of substantially flat shape and the RF circuit is a 900 MHz RF circuit as shown in FIG. 7. In another embodiment of the present invention, the substrate can be a Kevlar helmet as shown in FIG. 8. Thus, it should be apparent that the present invention is not constrained to particular sizes, shapes, or types of materials.

Thus, a method of incorporating an antenna and/or RF circuitry onto objects has been provided. The present invention contemplates numerous variations in the size, shape, composition, and properties of the objects, the technologies used to place the antenna and/or circuitry onto the object, the algorithms or tools used in the design process, and other variations. The present invention is not to be limited to what is specifically described herein.

What is claimed is:

1. A method for incorporating a conformal antenna and conformal RF circuitry onto a substrate, the substrate being a non-planar surface of an object having a size, material properties, and a three-dimensional shape, the method comprising:
    forming a three-dimensional model to model the object including the substrate, the substrate having a plurality of bends and curves, the substrate not being constrained by the conformal RF circuitry or the conformal antenna;
    designing a reference planar antenna model;
    designing a conformal antenna model based on the reference planar antenna model;
    designing a reference RF circuit model;
    designing a conformal RF circuit model based on the reference RF circuit model;
    using the conformal antenna model, the conformal RF circuit model, and the three-dimensional model in designing the conformal antenna and the conformal RF circuitry for direct placement on the surface of the object, wherein the designing of the conformal antenna and the conformal RF circuitry uses parameters defined by the size, three-dimensional shape, and material properties of the surface of the object acting as the substrate such that the conformal antenna and the conformal RF circuitry wrap around the substrate;
    manufacturing the conformal antenna and the conformal RF circuitry on the substrate using the conformal antenna model, the conformal RF circuit model, and the three-dimensional model, wherein the manufacturing comprises direct writing or direct printing the conformal antenna and the conformal RF circuitry on the surface of the object acting as the substrate such that the conformal antenna and the conformal RF circuitry wrap around the substrate.

2. The method of claim 1 wherein the three-dimensional model is a three-dimensional CAD model of the object.

3. The method of claim 1 wherein the step of forming the three-dimensional model includes scanning the object.

4. The method of claim 1 wherein the step of designing the conformal antenna and the conformal RF circuitry comprises applying an evolutionary algorithm.

5. The method of claim 1 wherein the evolutionary algorithm comprises a genetic algorithm.

6. The method of claim 1 wherein the step of designing the conformal antenna and the conformal RF circuitry comprises applying a neutral network.

7. The method of claim 1 wherein the surface of the object is irregular.

8. The method of claim 1 wherein the step of designing the conformal antenna and the conformal RF circuitry includes using an electromagnetic solver to determine design parameters.

9. The method of claim 1 wherein the step of designing the conformal antenna and the conformal RF circuitry includes using parallel processing to determine design parameters.

10. The method of claim 1 wherein the conformal RF circuitry comprises a plurality of layers.

11. The method of claim 1 wherein the conformal RF circuitry and the conformal antenna comprise a plurality of layers.

12. The method of claim 1 further comprising placing the conformal antenna and the conformal RF circuitry on the surface of the object.

13. The method of claim 12 wherein the step of placing includes direct writing on the surface of the object.

14. The method of claim 1 wherein the material properties include electrical properties of the material.

15. The method of claim 1 wherein the material properties include a dielectric constant of the material.

16. The method of claim 1 wherein at least a portion of the antenna or RF circuit being positioned on a curved surface of the object.

17. The method of claim 1 wherein the antenna being a compressed antenna.

18. The method of claim 1 wherein the antenna or RF circuit being wrapped at least partially around the object.

19. The method of claim 1 wherein the object being formed of a metal and wherein the method further comprises modifying the surface of the object by adding an insulator.

20. The method of claim 1 further comprising modifying the surface of the object with an underlayer.

21. The apparatus of claim 1 wherein the object is a Kevlar helmet or a ceramic coffee mug.

22. A method for incorporating a conformal antenna into an object with a surface of the object acting as a substrate for the conformal antenna, the object having a size, a three-dimensional shape, and material properties, the method comprising:
    modeling the object as a three-dimensional object to provide a three-dimensional model, the three-dimensional model incorporating the size, three-dimensional shape, and material properties of the object;
    designing a reference planar antenna model;

designing a conformal antenna model based on the reference planar antenna model;

designing the conformal antenna using the conformal antenna model and the three-dimensional model to provide a conformal antenna design adapted to conform to the surface of the object, the antenna design at least partially based on the size, three-dimensional shape, and material properties of the surface of the object acting as the substrate;

improving the design of the conformal antenna by applying an evolutionary optimization process;

placing the conformal antenna on the surface of the object without a separate substrate.

23. The method of claim 22 further comprising modifying the surface of the object by applying an underlayer to a portion of the surface of the object.

24. The method of claim 22 wherein the step of placing comprises direct writing.

25. The method of 22 wherein evolutionary optimization process uses a genetic algorithm.

26. The method of claim 22 wherein the evolutionary optimization process provide for simulation of the conformal antenna using an electromagnetic solver.

27. The method of claim 22 further comprising placing additional circuit elements on the surface of the object.

28. An apparatus comprising:

an object having a three-dimensional shape with a three-dimensional surface of the object acting as a substrate;

a conformal antenna;

a conformal radio-frequency circuit operatively connected to the conformal antenna;

wherein the conformal antenna and the conformal radio-frequency circuit being directly written on the three-dimensional surface of the object and in direct contact with the three-dimensional surface of the subject; and wherein the three-dimensional surface of the object having a plurality of bends and curves;

wherein the three-dimensional shape of the object is not constrained by the conformal antenna or the conformal radio-frequency circuit;

wherein the conformal antenna and the conformal radio-frequency circuit are designed to conform to the three-dimensional shape of the object.

\* \* \* \* \*